(12) United States Patent
Misra et al.

(10) Patent No.: US 11,361,243 B2
(45) Date of Patent: Jun. 14, 2022

(54) RECOMMENDING MACHINE LEARNING TECHNIQUES, FEATURES, AND FEATURE RELEVANCE SCORES

(71) Applicant: Accenture Global Solutions Limited, Dublin (IE)

(72) Inventors: Janardan Misra, Bangalore (IN); Divya Rawat, Dehradun (IN); Shubhashis Sengupta, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 1060 days.

(21) Appl. No.: 15/982,565

(22) Filed: May 17, 2018

(65) Prior Publication Data

US 2018/0357511 A1 Dec. 13, 2018

(30) Foreign Application Priority Data

Jun. 7, 2017 (IN) .............................. 201741019972

(51) Int. Cl.
*G06N 20/00* (2019.01)
*G06K 9/62* (2022.01)
(Continued)

(52) U.S. Cl.
CPC ............ *G06N 20/00* (2019.01); *G06K 9/623* (2013.01); *G06K 9/6215* (2013.01); *G06K 9/6262* (2013.01); *G06N 5/025* (2013.01); *G06N 20/10* (2019.01); *G06N 20/20* (2019.01); *G06N 3/0454* (2013.01); *G06N 5/02* (2013.01); *G06N 7/005* (2013.01)

(58) Field of Classification Search
CPC .... G06K 9/623; G06K 9/6262; G06K 9/6215; G06N 5/02; G06N 5/025; G06N 3/0454; G06N 7/005; G06N 20/00; G06N 20/20; G06N 20/10
USPC ......................................................... 706/12
See application file for complete search history.

(56) References Cited

U.S. PATENT DOCUMENTS

2018/0075137 A1* 3/2018 Lifar ...................... G06F 17/16

OTHER PUBLICATIONS

Malik, Kartik et al.; A method and system for recommending data analytics processes; India Invention Application Publication No. IN 6377/CHE/2015; pp. 1-11. (Year: 2017).*

(Continued)

*Primary Examiner* — Eric Nilsson
(74) *Attorney, Agent, or Firm* — Harrity & Harrity, LLP

(57) ABSTRACT

A device may identify, for a first analytics application, a first set of characteristics and obtain, for a second analytics application, a second set of characteristics. The device may determine a measure of similarity between the first analytics application and the second analytics application based on the first set of characteristics and the second set of characteristics. The device may also determine a relevance score for a feature of the first analytics application, the relevance score being based on a relevance score associated with a feature of the second analytics application. In addition, the device may determine a relevance score for a machine learning technique associated with the first analytics application, the relevance score being based on a relevance score associated with a machine learning technique associated with the second analytics application. Based on the first relevance score or the second relevance score, the device may perform an action.

20 Claims, 8 Drawing Sheets

(51) Int. Cl.
*G06N 20/10* (2019.01)
*G06N 20/20* (2019.01)
*G06N 5/02* (2006.01)
*G06N 3/04* (2006.01)
*G06N 7/00* (2006.01)

(56) References Cited

OTHER PUBLICATIONS

Yang, et. al., "Recommending the World's Knowledge: Application of Recommender Systems at Quora", RecSys'16: Proceedings of the 10th ACM Conference on Recommender System, Sep. 2016 (Year: 2016).*

* cited by examiner

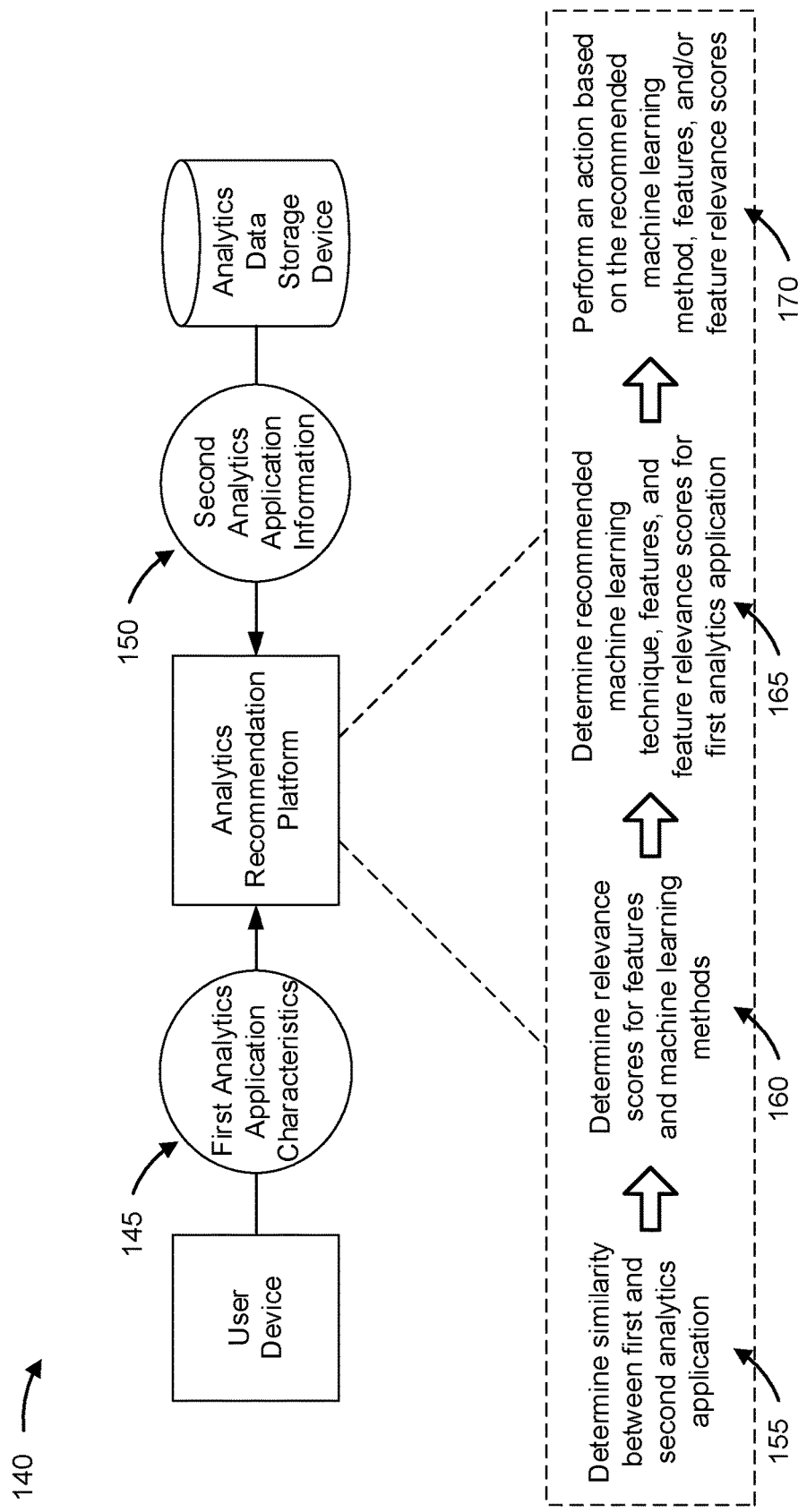

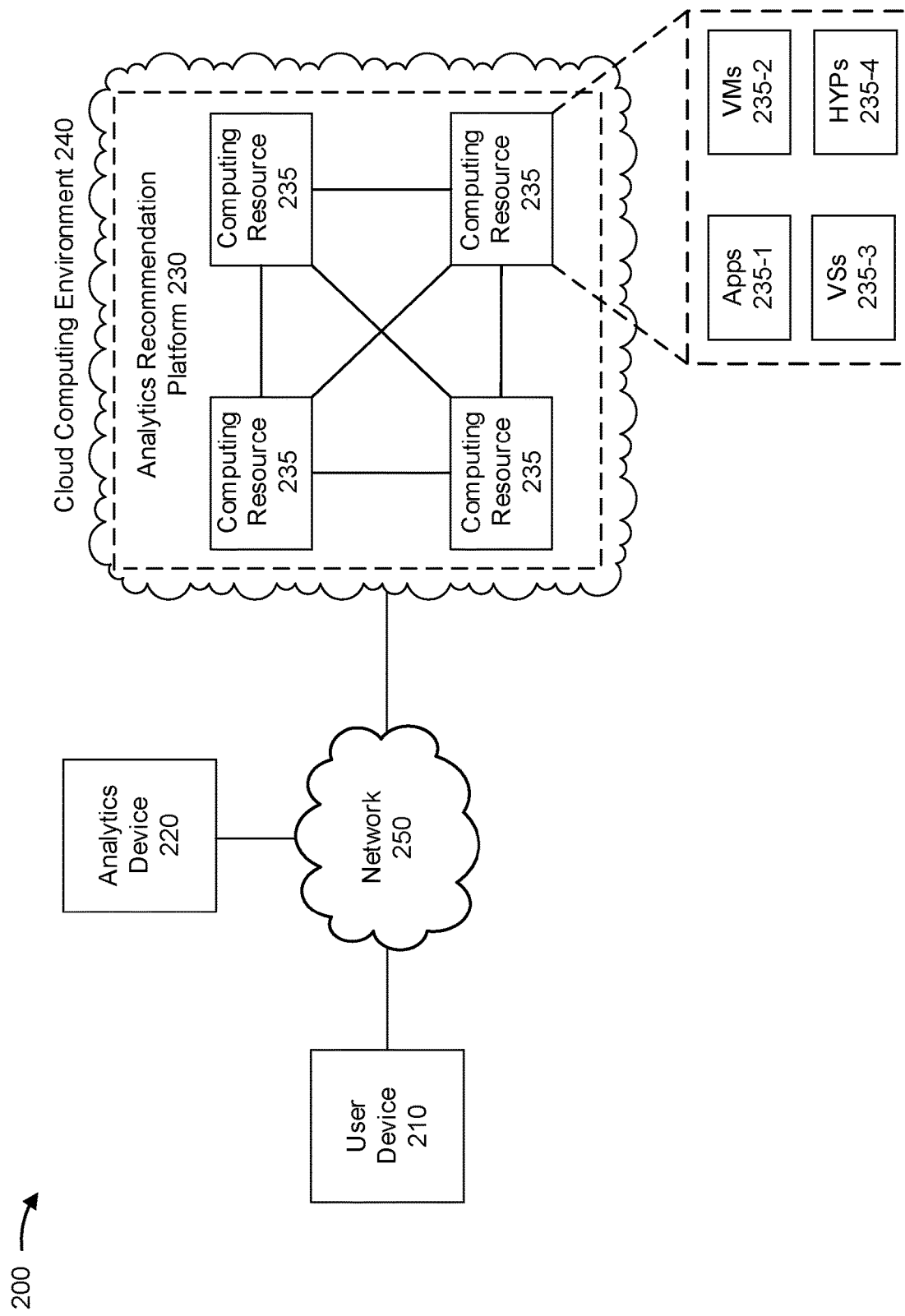

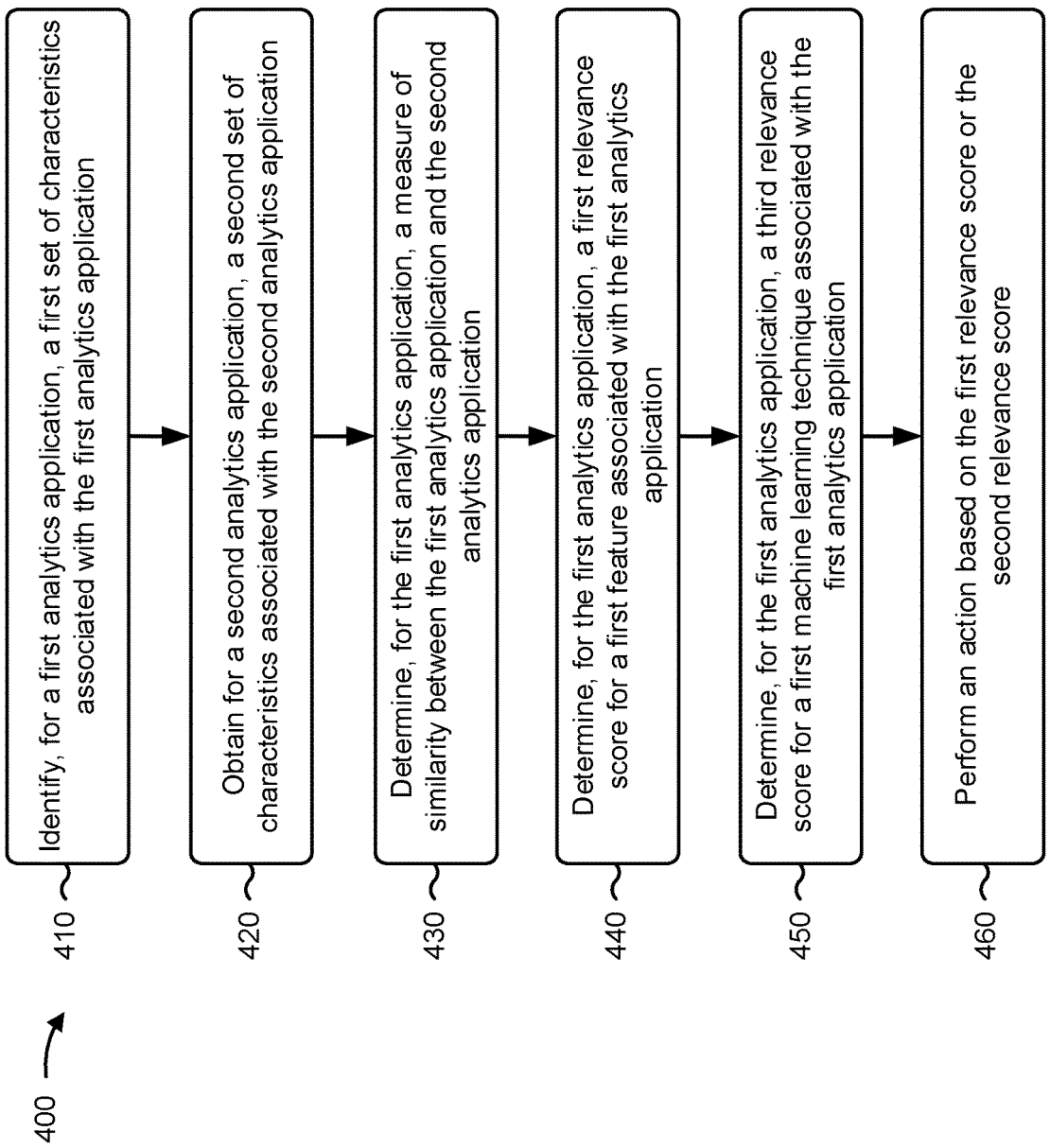

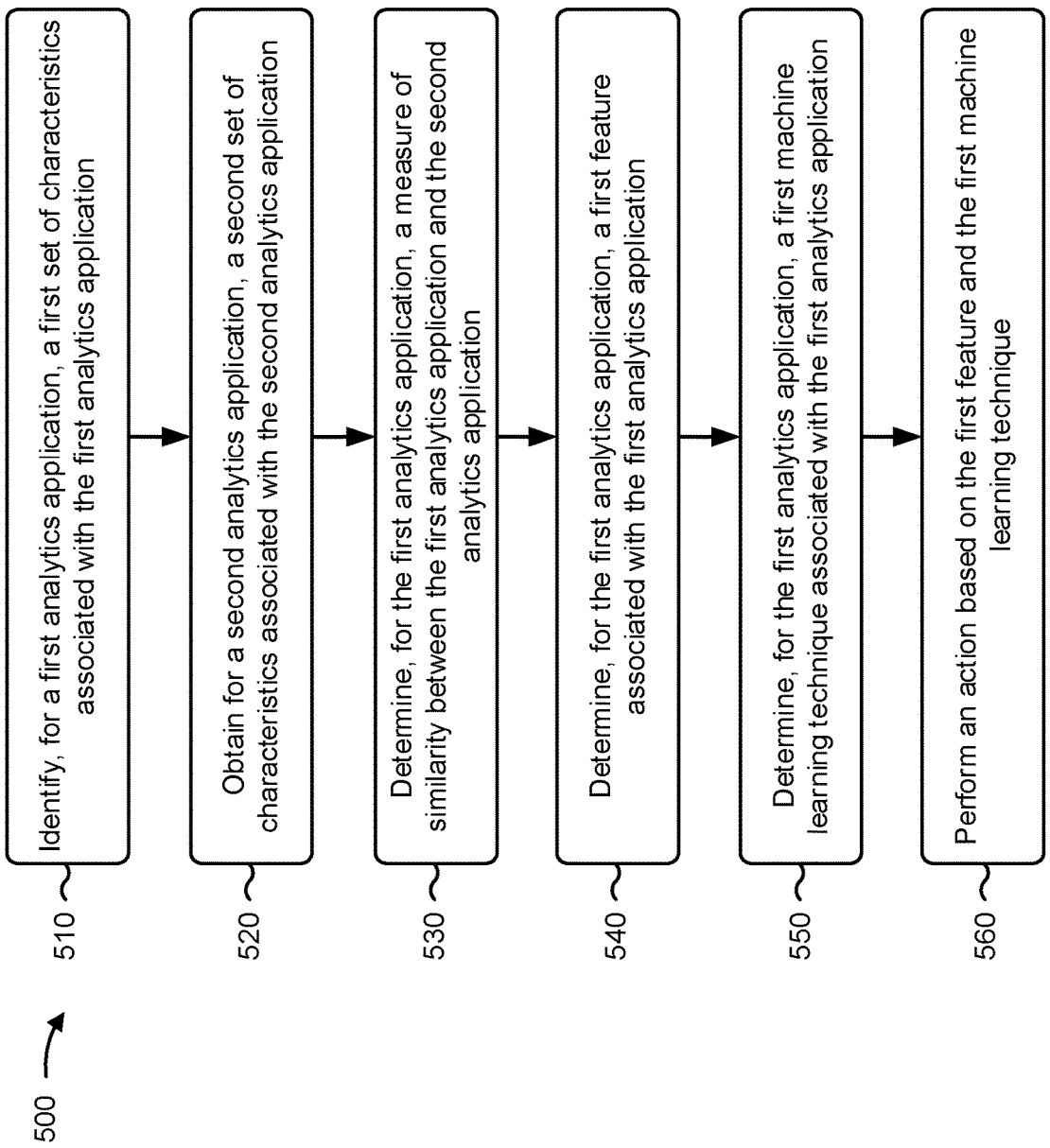

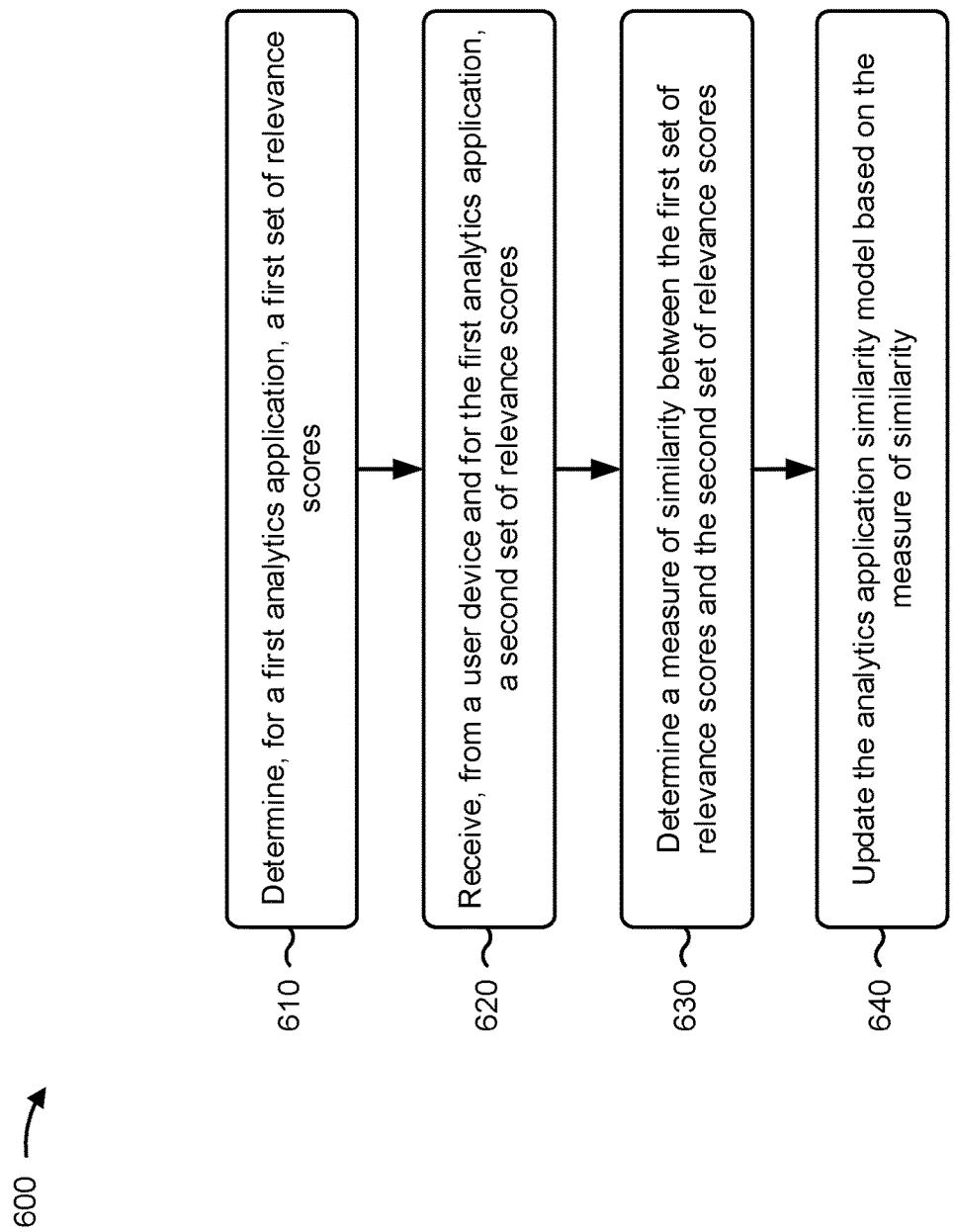

RECOMMENDING MACHINE LEARNING TECHNIQUES, FEATURES, AND FEATURE RELEVANCE SCORES

CROSS-REFERENCE TO RELATED APPLICATION

This application claims priority under 35 U.S.C. § 119 to Indian Patent Application No. 201741019972, filed on Jun. 7, 2017, the content of which is incorporated by reference herein in its entirety.

BACKGROUND

Analytics applications are designed to enable computing devices to perform analytics, or the discovery, interpretation, and communication of meaningful patterns in data. Analytics applications often use data models (e.g., "models") that are trained, e.g., using a variety of machine learning techniques, to produce outputs designed to provide analytics information that is useful to a user. A model used by an analytics application generally includes a machine learning method or technique (e.g., a machine learning algorithm) and multiple features (e.g., measurable properties of data provided as input to the analytics application) with corresponding feature weights, or parameters.

SUMMARY

According to some implementations, a method may comprise: identifying, by a device and for a first analytics application, a first set of characteristics associated with the first analytics application; obtaining, by the device and for a second analytics application, a second set of characteristics associated with the second analytics application; determining, by the device and for the first analytics application, a measure of similarity between the first analytics application and the second analytics application, the measure of similarity being determined based on the first set of characteristics and the second set of characteristics; determining, by the device and for the first analytics application, a first relevance score for a first feature associated with the first analytics application, the first relevance score being based on the measure of similarity and a second relevance score associated with a second feature associated with the second analytics application; determining, by the device and for the first analytics application, a third relevance score for a first machine learning technique associated with the first analytics application, the third relevance score being based on the measure of similarity and a fourth relevance score associated with a second machine learning technique associated with the second analytics application; and performing, by the device, an action based on the first relevance score or the second relevance score.

According to some implementations, a device may comprise: one or more memories; and one or more processors, communicatively coupled to the one or more memories, to: identify, for a first analytics application, a first set of characteristics associated with the first analytics application; obtain, for a second analytics application, a second set of characteristics associated with the second analytics application; determine, for the first analytics application, a measure of similarity between the first analytics application and the second analytics application, the measure of similarity being determined based on the first set of characteristics and the second set of characteristics; determine, for the first analytics application, a first feature associated with the first analytics application, the first feature being based on the measure of similarity and a second feature associated with the second analytics application; determine, for the first analytics application, a first machine learning technique associated with the first analytics application, the first machine learning technique being based on the measure of similarity and a second machine learning technique associated with the second analytics application; and perform an action based on the first feature and the first machine learning technique.

According to some implementations, a non-transitory computer-readable medium may store instructions, the instructions comprising: one or more instructions that, when executed by one or more processors, cause the one or more processors to: determine, for a first analytics application, a first set of relevance scores, each relevance score, included in the first set of relevance scores, being associated with a respective feature of the first analytics application, and the determination being based on an analytics application similarity model; receive, from a user device and for the first analytics application, a second set of relevance scores; determine a measure of similarity between the first set of relevance scores and the second set of relevance scores; and update the analytics application similarity model based on the measure of similarity.

BRIEF DESCRIPTION OF THE DRAWINGS

FIGS. 1A-1C are diagrams of an example implementation described herein.

FIG. 2 is a diagram of an example environment in which systems and/or methods, described herein, may be implemented.

FIGS. 4-6 are flow charts of an example process for recommending machine learning techniques, features, and feature relevance scores.

DETAILED DESCRIPTION

Figure 1A:
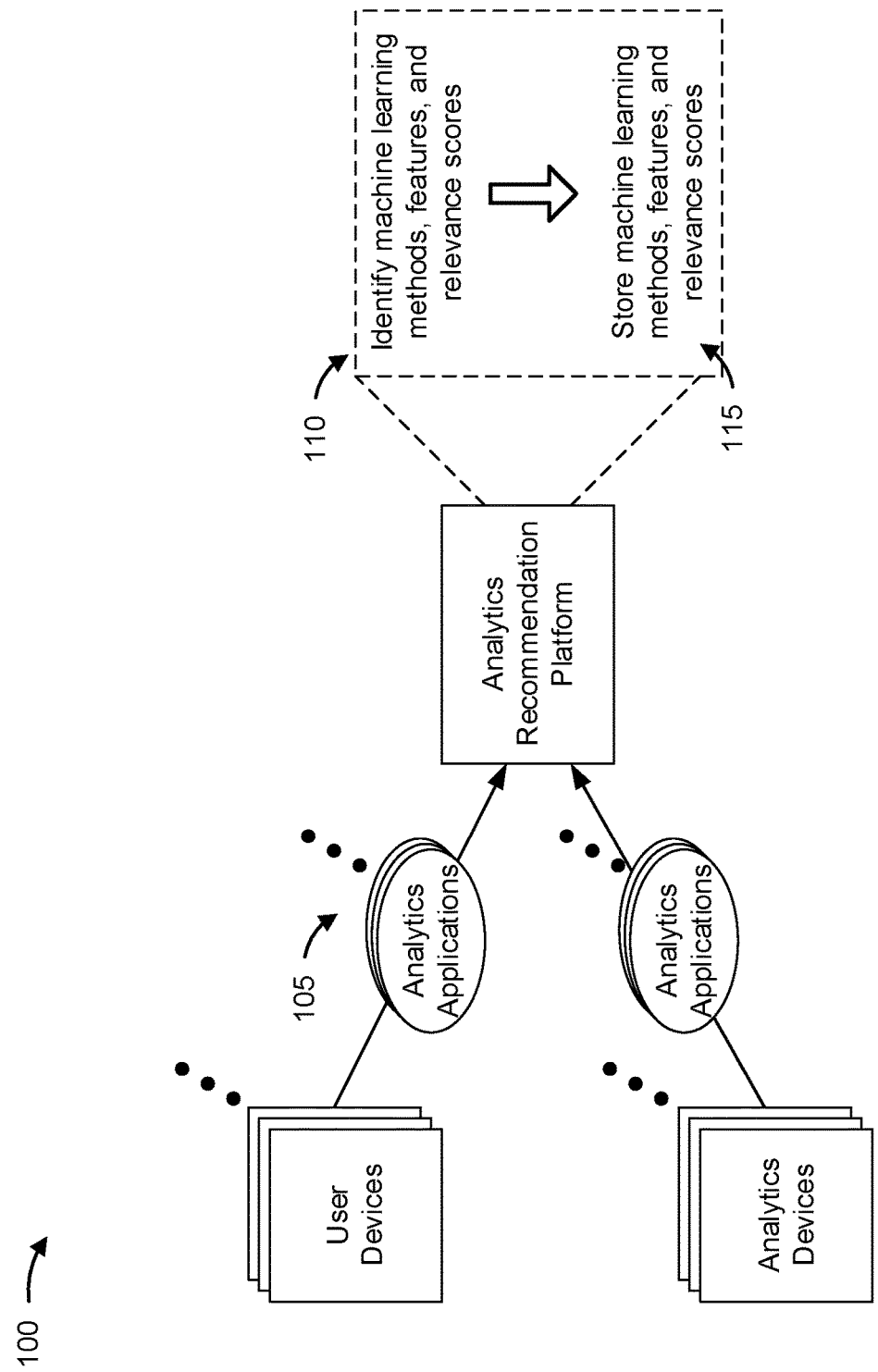

The following detailed description of example implementations refers to the accompanying drawings. The same reference numbers in different drawings may identify the same or similar elements.

Often, a developer may be assigned to determine, for an analytics application (e.g., an application designed to provide information identifying meaningful patterns in data), which machine learning technique to use (e.g., a natural language processing technique, a computer vision technique, and/or the like), which features to use (e.g., a feature being a measurable property of a digital object, such as a numeric property, a string-based property, a graph-based property, and/or the like), and how much of a relevance score (e.g., weight) to assign each feature. However, manually selecting the machine learning technique, features, and relevance scores (or weights) for performing an analytics application (e.g., feature extraction, classification, and/or the like) may require that the developer possess specialized knowledge regarding a field associated with the corpus of digital objects to be analyzed, such as specialized knowledge regarding the medical field (e.g., for analytics applications related to medical documents), a legal field (e.g., for analytics applications related to legal documents), a web page ranking field (e.g., for analytics applications related to web page rankings), or the like. Moreover, the developer may be required to have specialized knowledge of machine learning techniques and features. Additionally, training a model for use in an analytics application may often involve significant iterations and testing to identify a well-trained model. Furthermore, custom selection of machine learning techniques, features, and relevance scores may be time-consuming, error prone, and resource intensive.

Some implementations, described herein, provide an analytics recommendation platform (e.g., cloud computing platform, server computer, and/or the like) designed to identify a recommended machine learning technique, recommended features, and recommended feature relevance scores (e.g., weights) for an analytics application. For example, the analytics recommendation platform may receive, from a user device (e.g., a personal computer, mobile device, server computer, and/or the like), data defining one or more characteristics of an analytics application (e.g., a description of the analytics application, training data with annotations, test data, portions of data to be analyzed, and/or the like). Using the characteristics of the analytics application, the analytics recommendation platform may identify similar analytics applications for which a model has already been trained (e.g., the model including a machine learning technique, features, and feature relevance scores). After identifying similar analytics applications, the analytics recommendation platform may use the machine learning techniques, features, and feature relevance scores of the similar analytics applications to determine, for the analytics application, a recommended machine learning technique, recommended features, and recommended relevance scores (e.g., weights) for the recommended features. The recommendations may be provided, for example, to the user device, enabling the user device to execute the analytics application using a recommended model derived from the recommended machine learning technique, recommended features, and recommended feature relevance scores. In some implementations, user feedback (e.g., in the form of an updated analytics application with an updated machine learning technique, updated features, and/or updated feature relevance scores) may be used to train a model used by the analytics recommendation platform to determine similarities between analytics applications.

In this way, an analytics recommendation platform may enable users, including non-technical users and users unfamiliar with machine learning or a particular corpus of digital objects, to obtain a recommended machine learning model by providing one or more characteristics of an analytics application to the analytics recommendation platform. Recommending machine learning models may enable a wider variety of individuals to obtain and use machine learning models for a variety of analytics applications. Several different stages of the process for determining recommended machine learning techniques, features, and feature relevance scores (e.g., feature weights) are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. Also, automating the process for determining machine learning techniques, features, and feature relevance scores conserves computing resources (e.g., processor resources, memory resources, and/or the like) that would otherwise be wasted by using multiple different types of devices with different software, protocols, and configurations, and computing resources that would otherwise be wasted correcting problems that would arise from lack of consistency in the determination of machine learning techniques, features, and feature relevance scores.

Figure 1C:
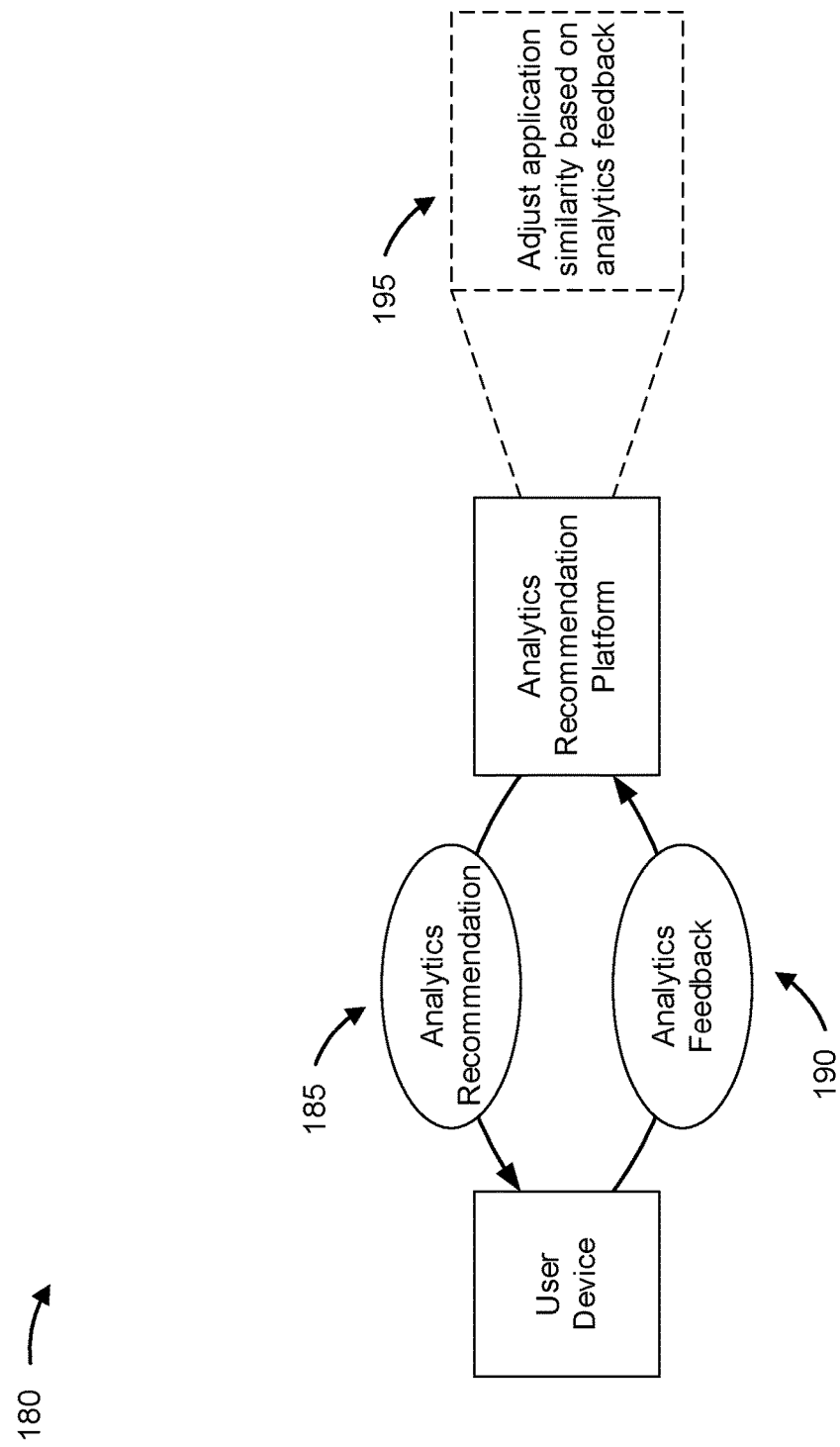

FIGS. 1A-1C are diagrams of an example implementation 100 described herein. As shown in FIG. 1A, example implementation 100 includes user devices (e.g., personal computers, server computers, mobile devices, and/or the like), analytics devices (e.g., server computers, personal computers, cloud computing devices, and/or the like), and an analytics recommendation platform (e.g., a cloud computing platform, server computer, and/or the like). While the devices of implementation 100 are depicted separately, in some implementations, the functionality of one or more of the devices of implementation 100 may be included in another device, or may be included in multiple, distributed devices.

As shown by reference number 105, the analytics recommendation platform receives information regarding analytics applications from user devices and analytics devices. For example, an analytics device may include a device designed to execute analytics applications (e.g., natural language processing, image classification, object recognition, and/or the like) by using machine learning models. The user devices may include, for example, devices that include or otherwise have access to information regarding analytics applications (e.g., user devices from which execution of an analytics application is requested, user devices to which analytics application results are provided, and/or the like).

The analytics application information may include a variety of information regarding an analytics application, such as a description of the analytics application, one or more machine learning techniques that were used when executing the analytics application, features used to execute the analytics application, feature relevance scores (e.g., weights) used to execute the analytics application, and/or the like. By way of example, a textual analytics application may be designed to take text as input and determine whether the text is related to a particular category, such as a financial category. Information regarding the textual analytics application may include, for example, an analytics application identifier (e.g., alpha-numerical identifier), a brief description of the textual analytics application (e.g., a textual description indicating that the textual analytics application is intended to detect text that is related to financial events), a detailed description (e.g., a detailed textual description of the types of financial events to be detected and the manner in which the financial events might be detected), training data (e.g., annotated training data that includes documents previously identified as either related to financial events or not related to financial events), analysis unit (e.g., word level, sentence level, paragraph level, document level, and/or the like, at which training data is annotated and for which the analytics application is to analyze), machine learning technique used (e.g., supervised, unsupervised, or a combination of supervised and unsupervised machine learning technique, including support vector machine (SVM), conditional random field (CRF), Naive Bayes, convolutional neural networks, K-nearest neighbors, and/or the like), features used (e.g., key words, n-grams, word relationships, and/or the like), feature relevance scores used (e.g., feature weights assigned to the features, indicating a measure of importance of the feature to the machine learning technique), and/or the like.

In this way, the analytics recommendation platform may receive information regarding a variety of existing analytics applications, enabling the analytics recommendation platform to use the existing analytics application information to make recommendations regarding a new analytics application.

As shown by reference number 110, the analytics recommendation platform identifies, from the analytics application information, machine learning techniques, features, and/or feature relevance scores for the analytics applications. As noted above, the foregoing features, including other characteristics of the analytics applications, may be included in the analytics application information received by the analytics recommendation platform. The analytics recommendation platform may, as shown by reference number 115, store the analytics application information (e.g., the analytics application characteristics, the machine learning techniques, features, and/or feature relevance scores). The analytics recommendation platform may store data locally (e.g., in a local data storage device) and/or at a remote location (e.g., in a remote data storage device, distributed data storage devices, and/or the like). The analytics application information may be stored in a variety of data structures that enable access to the analytics application information, such as a database that enables querying the database to obtain analytics application information based on the queries (e.g., queries for analytics applications associated with various analytics application characteristics, machine learning techniques, features, feature relevance scores, and/or the like). In this way, the analytics recommendation platform identifies and stores information associated with analytics applications in a manner designed to enable the information to be obtained later (e.g., for comparison with analytics applications for which the analytics recommendation platform is to make a recommendation).

As shown in FIG. 1B, example implementation 140 includes a user device (e.g., one of the user devices depicted in FIG. 1A, or a different user device), the analytics recommendation platform, and an analytics data storage device (e.g., a local or remote data storage device or devices).

As shown by reference number 145, the analytics recommendation platform receives first analytics application characteristics from the user device. The first analytics application characteristics may include any information that defines at least a portion of the first analytics application, such as a description of the analytics application, training data with annotations, test data, portions of data to be analyzed, and/or the like.

By way of example, the first analytics application may be an application designed to analyze text included in social media posts to identify posts related to announcements and categorize the posts. Using the social media analytics application example, the characteristics of the first analytics application may include, for example, a textual description. An example brief textual description may include: "extracting, from social media posts, data related to announcements." An example of a more detailed textual description may include: "announcements can be identified by certain keywords, such as "announcement, announce, presenting, introducing, new," and temporal keywords that specify a particular date, time, and/or the like; and the announcements should be categorized into one of the following categories, "books, celebration, celebrity, concert, conflict, death, exhibit, fashion, finance, fitness, food, fundraiser, graduation, holiday, interview, legal, medical, meeting, movie, music, opening/closing, party, politics, prize, product release, religion, sale, school, sports, television, video games, weddings, or other."" Example training data may include annotated social media posts, where each post has been positively identified as being related to an announcement, and the posts have also been associated with one or more categories. The example characteristics may include an analysis unit indicating the portions of the social media posts to be analyzed, such as a sentence-level analysis for all sentences included in a social media post. The example characteristics may also include test data, e.g., a collection of social media posts that have not been annotated. The above examples are provided as an example, and other data could be included in the first analytics application characteristics.

While the example implementation 140 depicts a user device providing first analytics application characteristics, in some implementations, an analytics device (e.g., one of the analytics devices depicted in FIG. 1A, or a different analytics device) may provide the analytics recommendation platform with the first analytics application characteristics. As described below, the first analytics application characteristics may be used to identify similar analytics applications for which machine learning models have already been trained.

As shown by reference number 150, the analytics recommendation platform obtains second analytics application information (e.g., for an analytics application that is different from the first analytics application) from, in this example, the analytics data storage device. The second analytics application information may include a variety of information regarding a second analytics application, such as analytics application characteristics, machine learning technique used by the second analytics application, features used by the machine learning technique, and/or relevance scores (e.g., weights) associated with the features.

In some implementations, the analytics recommendation platform may obtain the second analytics application information based on an analytics application type associated with the first analytics application. For example, the analytics recommendation platform may determine, from the first analytics application characteristics, that the first analytics application is a textual analysis application (e.g., as opposed to a computer vision application, speech recognition application, and/or the like). Based on the determination, the analytics recommendation platform may select the second analytics application based on the second analytics application being the same type (e.g., textual analytics). In some implementations, the selection of the second analytics application may be more specifically selected based on a sub-type, if applicable, or one or more other characteristics. For example, textual analytics applications may include a variety of different sub-types of textual analytics, such as classification, sentiment analysis, document summarization, text clustering, entity relationship modeling, and/or the like. In this situation, the analytics recommendation platform may select the second analytics application based on the second analytics application matching one or more sub-types associated with the first analytics application (e.g., text classification in the social media post classification example).

While the example implementation 140 depicts the analytics recommendation platform obtaining analytics application information for a single second analytics application, in some implementations the analytics recommendation platform may receive analytics application information for multiple second analytics applications, e.g., in a manner designed to enable the analytics recommendation platform to use multiple analytics applications to recommend a machine learning technique, features, and feature relevance scores for the first analytics application. In some implementations, the second analytics application information may include a similarity model, such as the similarity model described in further detail below, to be used for determining similarity between the first analytics application and the second analytics application.

As shown by reference number 155, the analytics recommendation platform determines a measure of similarity between the first analytics application and the second analytics application. The measure of similarity may be determined, for example, by comparing the characteristics of the first analytics application and corresponding characteristics of the second analytics application. For example, the brief description of the first analytics application may be compared to the brief description of the second analytics application, the detailed description of the first analytics application may be compared to the detailed description of the second analytics application, the annotated training data associated with the first analytics application may be compared to the annotated training data associated with the second analytics application, and/or the like. Based on the comparisons and similarities between the characteristics (e.g., similar keywords, similar analysis units, similar annotations, and/or the like), the analytics recommendation platform may determine a measure of similarity between the first analytics application and the second analytics application.

In some implementations, the analytics recommendation platform may use a similarity model (e.g., a machine learning model trained to determine a measure of similarity between analytics applications based on one or more characteristics of the analytics applications) to determine a measure of similarity between the first analytics application and the second analytics application. In this situation, one or more of the characteristics of the first analytics application may be provided, as input, to the similarity model. The similarity model may provide, as output, data indicating a measure of similarity between the first analytics application and the second analytics application (or multiple measures of similarity in a situation where measures of similarity are obtained for multiple second analytics applications).

As noted above, in some implementations, the analytics recommendation platform may obtain multiple measures of similarity. For example, in a situation where the analytics recommendation platform has access to the characteristics of multiple second analytics applications, the analytics recommendation platform may determine a measure of similarity between the first analytics application and each second analytics application for which the analytics recommendation platform has characteristics. The measure(s) of similarity may take a variety of forms, including a score (e.g., 0 to 1, where 0 indicates no similarity and 1 indicates identical characteristics), a categorical scale (e.g., not similar, somewhat similar, similar, identical, and/or the like), a binary measure (e.g., either not similar or similar), or another measure of similarity. In this way, the analytics recommendation platform may determine one or more measures of similarity, in a manner designed to enable the analytics recommendation platform to make a recommendation for the first analytics application based on the second analytics applications.

As shown by reference number 160, the analytics recommendation platform determines, for the first analytics application, relevance scores for machine learning techniques and features. The relevance scores may be determined based on the measure of similarity between the first analytics application and the second analytics application, and relevance scores associated with the features used by the second analytics application. For example, the second analytics application may be associated with a particular machine learning technique, and the analytics recommendation platform may determine a relevance score for the particular machine learning technique based on the measure of similarity between the first and second analytics applications. Similarly, the second analytics application may be associated with multiple features, and each of those features may have a corresponding relevance score (e.g., a feature weight) indicating the relevance of the features to the second analytics application. In this situation, the analytics recommendation platform may determine relevance scores for the first analytics application as a function of the relevance scores that correspond to the features and the measure of similarity between the first and second analytics applications.

By way of example, the measure of similarity between the first and second analytics applications may be a 0.75 on a 0 to 1 scale. A relevance score, for the first analytics application, may be determined for a machine learning technique used by the second analytics application as a function of the measure of similarity. For example, given the 0.75 measure of similarity, the analytics recommendation platform may determine that the machine learning technique used by the second analytics application has a 0.75 relevance score which, in this situation, may indicate a measure of likelihood that the machine learning technique is relevant to the first analytics application. The analytics recommendation platform may determine relevance scores for features in a similar manner. For example, the second analytics application may be associated with three different features, a relevance score of 0.8 for a first feature, a relevance score of 0.6 for a second feature, and a relevance score of 0.4 for a third feature. By combining (e.g., multiplying) the relevance scores associated with the features by the measure of similarity, the analytics recommendation platform may determine relevance scores associated with the three different features, for the first analytics application. For example, the analytics recommendation platform may determine that the first feature has a 0.6 relevance score (e.g., 0.8*0.75=0.6), the second feature has a 0.45 relevance score (e.g., 0.6*0.75=0.45), and the third feature has a 0.3 relevance score (e.g., 0.4*0.75).

In some implementations, the analytics recommendation platform may determine, for the first analytics application, relevance scores for machine learning techniques and/or features based on measures of similarity with respect to multiple second analytics applications. For example, in a manner similar to that described above, the analytics recommendation platform may determine relevance scores for one or more machine learning techniques and features based on measures of similarity between the first application and one or more second analytics applications. By way of example, the analytics recommendation platform may determine relevance scores based on a third analytics application of the second analytics applications. The third analytics application may be associated with two machine learning techniques, including the same machine learning technique associated with the second analytics application. The third analytics application may also be associated with relevance scores for two features, e.g., a 0.7 relevance score for the second feature and a 0.9 relevance score for the third feature. Given a 0.5 measure of similarity between the first and third analytics applications, the analytics recommendation platform may determine, for the first analytics application, relevance scores based on the third analytics application, such as a relevance score of 0.35 (e.g., 0.7*0.5=0.35) for the second feature and 0.45 (e.g., 0.9*0.5) for the third feature, as well as a relevance score of 0.5 for each of the two machine learning techniques associated with the third analytics application.

In the examples given above, the analytics recommendation platform determined two sets of relevance scores, each set of relevance scores being based on a different analytics application (e.g., a first set of relevance scores based on the second analytics application, and a second set of relevance scores based on the third analytics application). In this situation, the analytics recommendation platform may use a combination of relevance scores to determine which relevance scores to recommend for the first analytics application. The relevance scores may be combined in a variety of ways.

In some implementations, the analytics recommendation platform may select a most relevant machine learning technique and/or feature relevance score. For example, for the first machine learning technique, the analytics recommendation platform determined a relevance score of 0.75 based on the second analytics application, and a relevance score of 0.5 for the third analytics application. The analytics recommendation platform also determined a relevance score of 0.5 for the second analytics application. In a situation where the machine learning technique relevance score is selected based on the highest relevance score, the analytics recommendation platform may determine that the relevance score for the first machine learning technique should be 0.75, while the relevance score for the second machine learning technique should be 0.5. Similarly, in a situation where the analytics recommendation platform uses the highest relevance score for the machine learning features (e.g., where the first feature has relevance scores of 0.6 and 0, the second feature has relevance scores of 0.45 and 0.35, and the third feature has relevance scores of 0.3 and 0.45), the analytics recommendation platform may determine that the relevance score for the first feature is 0.6, the relevance score for the second feature is 0.45, and the relevance score for the third feature is 0.45.

In some implementations, the analytics recommendation platform may select a least relevant machine learning technique and/or feature relevance score. For example, for the first machine learning technique, the analytics recommendation platform determined a relevance score of 0.75 based on the second analytics application, and a relevance score of 0.5 for the third analytics application. The analytics recommendation platform also determined a relevance score of 0.5 for the second analytics application. In a situation where the machine learning technique relevance score is selected based on the lowest relevance score, the analytics recommendation platform may determine that the relevance score for the first machine learning technique should be 0.5, while the relevance score for the second machine learning technique should be 0. Similarly, in a situation where the analytics recommendation platform uses the lowest relevance score for the machine learning features (e.g., where the first feature has relevance scores of 0.6 and 0, the second feature has relevance scores of 0.45 and 0.35, and the third feature has relevance scores of 0.3 and 0.45), the analytics recommendation platform may determine that the relevance score for the first feature is 0, the relevance score for the second feature is 0.35, and the relevance score for the third feature is 0.3.

In some implementations, the analytics recommendation platform may use an average of relevance scores to determine machine learning technique relevance scores and/or feature relevance scores. For example, for the first machine learning technique, the analytics recommendation platform determined a relevance score of 0.75 based on the second analytics application, and a relevance score of 0.5 for the third analytics application. The analytics recommendation platform also determined a relevance score of 0.5 for the second analytics application. In a situation where the machine learning technique relevance score is selected based on an average of relevance scores, the analytics recommendation platform may determine that the relevance score for the first machine learning technique should be 0.625, while the relevance score for the second machine learning technique should be 0.25. Similarly, in a situation where the analytics recommendation platform uses the lowest relevance score for the machine learning features (e.g., where the first feature has relevance scores of 0.6 and 0, the second feature has relevance scores of 0.45 and 0.35, and the third feature has relevance scores of 0.3 and 0.45), the analytics recommendation platform may determine that the relevance score for the first feature is 0.3, the relevance score for the second feature is 0.4, and the relevance score for the third feature is 0.375.

The analytics recommendation platform may use a variety of techniques and/or methods, in combination with, in addition to, and/or alternatively to the examples above, for using relevance scores associated with multiple analytics applications to determine, for the first analytics application, relevance scores for machine learning techniques and features. In some implementations, one or more thresholds may be used when determining relevance scores. For example, the analytics recommendation platform may ignore relevance scores above or below a threshold relevance score. As another example, median relevance scores may be used, rather than a maximum, minimum, or average. In this way, the analytics recommendation platform may use a variety of functions, techniques, methods, and/or the like, to determine, for the first analytics application, relevance scores that are based on measures of similarity between the first analytics application and second analytics applications. As described below, the relevance scores may be used to make a recommendation regarding the machine learning technique, features, and feature relevance scores to be used by the first analytics application.

As shown by reference number 165, the analytics recommendation platform may determine a recommended machine learning technique, recommended features, and recommended feature relevance scores for the first analytics application. The recommended machine learning technique, recommended features, and recommended feature relevance scores may be based on the relevance scores determined for the machine learning technique(s), features, and feature relevance scores (e.g., described above with respect to reference number 165).

In some implementations, the analytics recommendation platform may determine, as recommended machine learning techniques, features, and feature relevance scores, all of the machine learning techniques, features, and relevance scores determined for the first analytics application (e.g., the machine learning techniques, features, and feature relevance scores determined above, with respect to reference number 165). For example, using the above example relevance scores, the analytics recommendation platform may determine that the recommended machine learning techniques are the first and second machine learning techniques (with corresponding relevance scores), determine that the recommended features are the first, second, and third features, and determine that the recommended feature relevance scores are the relevance scores determined for the first, second, and third features.

In some implementations, the analytics recommendation platform may determine, as recommended machine learning techniques, features, and relevance scores, a subset of the machine learning techniques, features, and relevance scores determined for the first analytics application. For example, the analytics recommendation platform may limit the number of machine learning techniques and/or features to recommend (e.g., only recommend one machine learning technique and up to two features and corresponding feature relevance scores). As another example, the analytics recommendation platform may use one or more thresholds to determine which machine learning technique(s), features, and relevance scores to recommend. In this situation, the analytics recommendation platform may determine that any machine learning technique and/or feature with a corresponding relevance score that fails to meet a threshold should be excluded from being recommended. By way of example, using the example, relevance scores above for the second analytics application (e.g., 0.6, 0.45. and 0.3) and a threshold of 0.4, the analytics recommendation platform may determine to recommend the first and second features (e.g., the features corresponding to 0.6 and 0.45 relevance scores) while not recommending the third feature (e.g., associated with a 0.3 relevance score).

While the foregoing provides example implementations for determining recommended machine learning techniques, features, and relevance scores, some implementations may include additional or different techniques for determining which machine learning techniques, features, and/or relevance scores to recommend (e.g., random or pseudo-random selection determinations, determining only the top N relevant features should be recommended (where N is a positive integer), using predetermined preferences that might be associated with the entity that provided the first analytics application characteristics, and/or the like). In this way, the analytics recommendation platform may determine one or more recommended machine learning techniques, features, and relevance scores, which could be used to execute the first analytics application.

As shown by reference number 170, the analytics recommendation platform performs an action based on the recommended machine learning technique, features, and/or feature relevance scores. The action(s) performed by the analytics recommendation platform may vary, and may depend on a configuration of the analytics recommendation platform, data included in a request for a recommendation (e.g., associated with the first analytics application), user settings, and/or the like.

In some implementations, the analytics recommendation platform may provide the recommended machine learning technique(s), features, and/or feature relevance scores to another device. The recommendations may be provided to a device, such as a user device, analytics device, and/or the like, in a manner designed to enable the device to review the recommendations and/or cause analytics to be performed based on the recommendations. For example, a user of a user device may receive a recommended machine learning technique, recommended features, and recommended feature weights, and use the recommendations to create a machine learning model to be used in performing the first analytics application.

In some implementations, the analytics recommendation platform may generate a machine learning model for the first analytics application based on the recommended machine learning technique(s), features, and/or feature relevance scores. For example, the analytics recommendation platform may include or otherwise have access to instructions for generating various different types of machine learning models, and using the instructions, the analytics recommendation platform can create a machine learning model that uses the recommended machine learning technique and that also uses the recommended features; the recommended feature relevance scores may be used to assign weights to the recommended features. By way of example, for a text classification model, the analytics recommendation platform may generate a text classification model that uses the SVM technique, uses N-grams and word dependency as features, and uses the recommended feature relevance scores as weights for the N-grams and word dependency features. In some implementations, the first analytics application characteristics may be used to generate a machine learning model. For example, in addition to the example text classification model provided above, the analytics recommendation platform may determine that the text classification model is to analyze text at a sentence level, filtered using predetermined keywords, and classified according to a predetermined list of classes, each of which were provided with the first analytics application characteristics. In a situation where the characteristics of the first analytics application include test data, the analytics recommendation platform may, in some implementations, use the test data to test and/or train the machine learning model.

In some implementations, the analytics recommendation platform may execute the first analytics application based on the recommended machine learning technique(s), features, and/or feature relevance scores. For example, after generating a machine learning model (e.g., as described above) or having the machine learning model generated for the analytics recommendation platform, the analytics recommendation platform may use the machine learning model to execute the first analytics application. By way of example, the analytics recommendation platform may use a text classification model to classify text (e.g., using test data included in the first analytics application characteristics). In some implementations, rather than performing the first analytics application, the analytics recommendation platform may provide the machine learning model, and test data, to an analytics device to cause the analytics device to execute the first analytics application. Results of the first analytics application, in some implementations including the machine learning model, may be provided to the entity associated with the first analytics application (e.g., a user device associated with an entity that provided the first analytics application characteristics and requested a machine learning model recommendation).

In this way, the analytics recommendation platform may perform a variety of actions based on recommended machine learning techniques, features, and/or feature relevance scores, including making a recommendation regarding a machine learning model created using the recommendations. By facilitating the generation of a machine learning model in a mostly automated manner, as described above, the analytics recommendation platform may greatly increase the speed and accuracy of generating machine learning models for analytics applications, which may conserve computing resources (e.g., processor and/or memory resources) that would otherwise be used by the analytics recommendation platform to perform an inferior process.

As shown in FIG. 1C, example implementation 180 includes a user device (e.g., one of the user devices depicted in FIG. 1A, FIG. 1B, or a different user device), and the analytics recommendation platform. Example implementation 180 depicts the manner in which the analytics recommendation platform may use feedback regarding an analytics recommendation to adjust the similarity model and/or the measures of similarity between analytics models. While the analytics recommendation platform is, in the example implementation 180, communicating with a user device to provide a recommendation and receive feedback, in some implementations, one or more other devices may be used (e.g., another user device or devices, an analytics device or devices, and/or the like).

As shown by reference number 185, the analytics recommendation platform provides the user device with an analytics recommendation. For example, the analytics recommendation platform may provide the user device with a recommended machine learning technique, features, and feature relevance scores. As another example, the analytics recommendation may include a machine learning model (e.g., generated and/or trained using the recommendations provided by the analytics recommendation model). The analytics recommendation platform provides the user device with the analytics recommendation to enable the user device to perform an analytics application associated with the analytics recommendation.

As shown by reference number 190, the analytics recommendation platform receives analytics feedback data from the user device. The analytics feedback data may include a variety of information designed to enable the analytics recommendation platform to determine one or more updated machine learning techniques, features, and/or feature relevance scores for the analytics application associated with the analytics recommendation. For example, the analytics feedback may include information indicating updated feature relevance scores (e.g., feature weights) that the user device uses in the machine learning model that was recommended by the analytics recommendation platform. The analytics feedback enables the analytics recommendation platform to update the measures of similarity and/or the similarity model used to make the recommendations provided in the analytics recommendation.

As shown by reference number 195, the analytics recommendation platform adjusts analytics application similarity based on the analytics feedback. By adjusting application similarity (e.g., rather than adjusting the subset of analytics applications for which measures of similarity are determined, or adjusting the machine learning techniques, features, and feature relevance scores of the subset of analytics application), the analytics recommendation platform may improve the recommendations in a manner designed to preserve the intent of determining similarity with respect to similar types of analytics applications (e.g., comparing textual analysis applications to other textual analysis applications, comparing computer vision applications to other computer vision applications, and/or the like). In some implementations, the analytics recommendation platform may adjust the measures of similarity between the analytics application associated with the analytics recommendation and each other analytics application for which similarity measures were determined, such that the resulting recommended relevance scores match (or come as close to matching as possible) the relevance scores provided in the analytics feedback. In some implementations, the analytics recommendation platform may update the similarity model (e.g., the machine learning model used to determine similarity between analytics applications) based on the analytics feedback. For example, an updated measure of similarity determined for an analytics application may be used as training data to retrain the similarity model that is used to determine the measure of similarity between analytics applications. The additional training data and the ability to update the similarity model may facilitate more accurate determinations regarding similarity in future uses of the similarity model, which may further improve the analytics recommendations made by the analytics recommendation platform.

In this way, the analytics recommendation platform may enable users, including non-technical users and users unfamiliar with machine learning or a particular corpus, to obtain a recommended machine learning model by providing one or more characteristics of an analytics application to the analytics recommendation platform. Recommending machine learning models may enable a wider variety of individuals to obtain and use machine learning models for a variety of analytics applications. Several different stages of the process for determining recommended machine learning techniques, features, and feature relevance scores (e.g., feature weights) are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. Finally, automating the process for determining machine learning techniques, features, and feature relevance scores conserves computing resources (e.g., processor resources, memory resources, and/or the like) that would otherwise be wasted by using multiple different types of devices with different software, protocols, and configurations, and computing resources that would otherwise be wasted correcting problems that would arise from lack of consistency in the determination of machine learning techniques, features, and feature relevance scores.

As indicated above, FIGS. 1A-1C are provided merely as examples. Other examples are possible and may differ from what was described with regard to FIGS. 1A-1C.

FIG. 2 is a diagram of an example environment 200 in which systems and/or methods, described herein, may be implemented. As shown in FIG. 2, environment 200 may include a user device 210, an analytics device 220, an analytics recommendation platform 230, a computing resource 235, a cloud computing environment 240, and a network 250. Devices of environment 200 may interconnect via wired connections, wireless connections, or a combination of wired and wireless connections.

User device 210 includes one or more devices capable of receiving, generating, storing, processing, and/or providing information associated with analytics applications. For example, user device 210 may include a communication and/or computing device, such as a mobile phone (e.g., a smart phone, a radiotelephone, etc.), a laptop computer, a tablet computer, a handheld computer, server computer, a gaming device, a wearable communication device (e.g., a smart wristwatch, a pair of smart eyeglasses, etc.), or a similar type of device. User device 210 may include or otherwise have access to information regarding an analytics application and be capable of communicating with analytics device 220 and/or analytics recommendation platform 230 to receive recommendations regarding analytics applications and/or cause performance of an analytics application.

Analytics device 220 includes one or more devices capable of receiving, generating, storing, processing, and/or providing information associated with analytics applications. For example, analytics device 220 may include a communication and/or computing device, such as a mobile phone (e.g., a smart phone, a radiotelephone, etc.), a laptop computer, a tablet computer, a handheld computer, a gaming device, a wearable communication device, server device (e.g., a host server, a web server, an application server, etc.), a data center device, a cloud computing platform, or a similar type of device. An analytics device 220 may be configured to execute analytics applications and/or provide information regarding analytics applications.

Analytics recommendation platform 230 includes one or more devices capable of receiving, generating, storing, processing, and/or providing information associated with analytics applications. For example, analytics recommendation platform 230 may include a server device (e.g., a host server, a web server, an application server, etc.), a data center device, or a similar device. In some implementations, analytics recommendation platform 230 may be capable of communicating with user device 210 and/or analytics device 220, in a manner designed to perform one or more actions related to making recommendations for analytics applications.

In some implementations, as shown, analytics recommendation platform 230 may be hosted in cloud computing environment 240. Notably, while implementations described herein describe analytics recommendation platform 230 as being hosted in cloud computing environment 240, in some implementations, analytics recommendation platform 230 might not be cloud-based (i.e., may be implemented outside of a cloud computing environment) or might be partially cloud-based.

Cloud computing environment 240 includes an environment that delivers computing as a service, whereby shared resources, services, etc. may be provided to user device 210, analytics device 220, and/or analytics recommendation platform 230. Cloud computing environment 240 may provide computation, software, data access, storage, and/or other services that do not require end-user knowledge of a physical location and configuration of a system and/or a device that delivers the services. As shown, cloud computing environment 240 may include analytics recommendation platform 230 and computing resource 235.

Computing resource 235 includes one or more personal computers, workstation computers, server devices, or another type of computation and/or communication device. In some implementations, computing resource 235 may host analytics recommendation platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210, analytics device 220, and/or analytics recommendation platform 230. For example, application 235-1 may include software associated with analytics recommendation platform 233 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
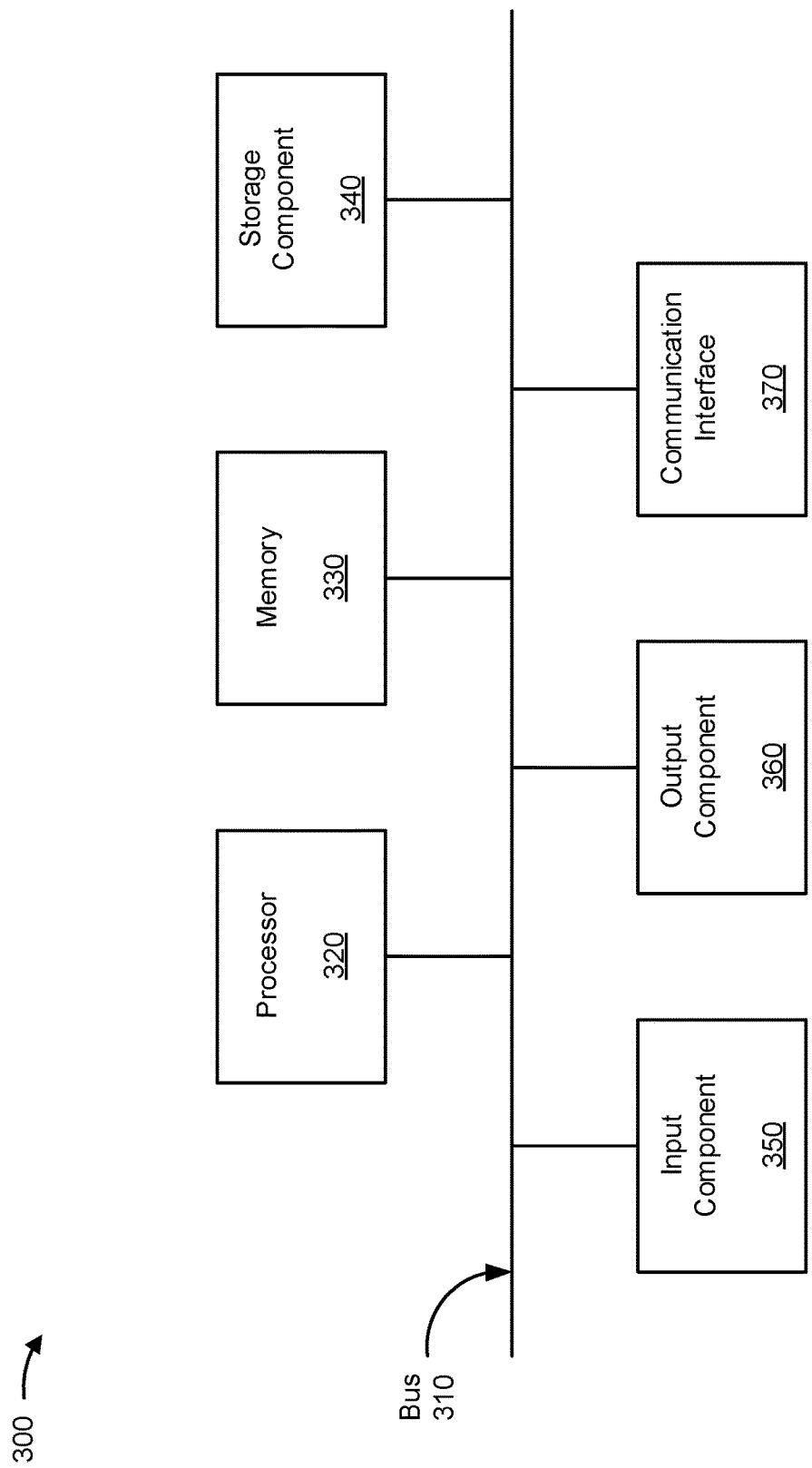
FIG. 3 is a diagram of example components of one or more devices of FIG. 2.

FIG. 3 is a diagram of example components of a device 300. Device 300 may correspond to user device 210, analytics device 220, analytics recommendation platform 230, and/or computing resource 235. In some implementations, user device 210, analytics device 220, analytics recommendation platform 230, and/or computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for recommending machine learning techniques, features, and feature relevance scores. In some implementations, one or more process blocks of FIG. 4 may be performed by analytics recommendation platform 230. In some implementations, one or more process blocks of FIG. 4 may be performed by another device or a group of devices separate from or including analytics recommendation platform 230, such as user device 210, analytics device 220, and computing resource 235.

As shown in FIG. 4, process 400 may include identifying, for a first analytics application, a first set of characteristics associated with the first analytics application (block 410). For example, an analytics recommendation platform (e.g., analytics recommendation platform 230, using computing resource 235, processor 320, memory 330, storage component 340, input component 350, communications interface 370, and/or the like) may identify, for a first analytics application, a first set of characteristics associated with the first analytics application, as described, for example, in connection with FIGS. 1A, 1B, and 1C.

As further shown in FIG. 4, process 400 may include obtaining, for a second analytics application, a second set of characteristics associated with the second analytics application (block 420). For example, the analytics recommendation platform (e.g., analytics recommendation platform 230, using computing resource 235, processor 320, memory 330, storage component 340, input component 350, communications interface 370, and/or the like) may obtain, for a second analytics application, a second set of characteristics associated with the second analytics application, as described, for example, in connection with FIGS. 1A, 1B, and 1C.

As further shown in FIG. 4, process 400 may include determining, for the first analytics application, a measure of similarity between the first analytics application and the second analytics application (block 430). For example, the analytics recommendation platform (e.g., analytics recommendation platform 230, using computing resource 235, processor 320, memory 330, storage component 340, input component 350, output component 360, communications interface 370, and/or the like) may determine, for the first analytics application, a measure of similarity between the first analytics application and the second analytics application, as described, for example, in connection with FIGS. 1A, 1B, and 1C. In some implementations, the measure of similarity may be determined based on the first set of characteristics and the second set of characteristics, As further shown in FIG. 4, process 400 may include determining, for the first analytics application, a first relevance score for a first feature associated with the first analytics application (block 440). For example, the analytics recommendation platform (e.g., analytics recommendation platform 230, using computing resource 235, processor 320, memory 330, storage component 340, and/or the like) may determine, for the first analytics application, a first relevance score for a first feature associated with the first analytics application, the first relevance score being based on the measure of similarity and a second relevance score associated with a second feature associated with the second analytics application, as described, for example, in connection with FIGS. 1A, 1B, and 1C.

As further shown in FIG. 4, process 400 may include determining, for the first analytics application, a third relevance score for a first machine learning technique associated with the first analytics application (block 450). For example, the analytics recommendation platform (e.g., analytics recommendation platform 230, using computing resource 235, processor 320, memory 330, storage component 340, and/or the like) may determine, for the first analytics application, a third relevance score for a first machine learning technique associated with the first analytics application, the third relevance score being based on the measure of similarity and a fourth relevance score associated with a second machine learning technique associated with the second analytics application, as described, for example, in connection with FIGS. 1A, 1B, and 1C.

As further shown in FIG. 4, process 400 may include performing an action based on the first relevance score or the second relevance score (block 460). For example, the analytics recommendation platform (e.g., analytics recommendation platform 230, using computing resource 235, processor 320, memory 330, storage component 340, input component 350, output component 360, communications interface 370, and/or the like) may perform an action based on the first relevance score or the second relevance score, as described, for example, in connection with FIGS. 1A, 1B, and 1C.

Process 400 may include additional aspects, such as any single aspect or any combination of aspects described below and/or in connection with one or more other processes described elsewhere herein.

In some implementations, the first feature is a measurable property of a digital object. In some implementations, the first feature includes at least one of: a syntactic feature, a lexical feature, a morphological feature, a grammatical feature, an ontological feature, or a statistical feature. In some implementations, the first machine learning technique includes one of: supervised machine learning technique, an unsupervised machine learning technique, or a combination of supervised and unsupervised machine learning techniques.

In some implementations, process 400 may include determining, for the first analytics application, a fifth relevance score for a third feature associated with the first analytics application, the fifth relevance score being based on the measure of similarity and a sixth relevance score associated with a fourth feature associated with the second analytics application, and the third feature being different from the first feature.

In some implementations, the first relevance score indicates a measure of importance of the first feature, relative to other features, to the first analytics application.

In some implementations, performing the action includes generating a recommended machine learning technique for the first analytics application, the recommended machine learning technique including the first machine learning technique and the first feature.

In some implementations, the first analytics application is configured to perform one or more analytics operations for textual input.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for recommending machine learning techniques, features, and feature relevance scores. In some implementations, one or more process blocks of FIG. 5 may be performed by analytics recommendation platform 230. In some implementations, one or more process blocks of FIG. 5 may be performed by another device or a group of devices separate from or including analytics recommendation platform 230, such as user device 210, analytics device 220, and computing resource 235.

As shown in FIG. 5, process 500 may include identifying, for a first analytics application, a first set of characteristics associated with the first analytics application (block 510). For example, an analytics recommendation platform (e.g., analytics recommendation platform 230, using computing resource 235, processor 320, memory 330, storage component 340, input component 350, communications interface 370, and/or the like) may identify, for a first analytics application, a first set of characteristics associated with the first analytics application, as described, for example, in connection with FIGS. 1A, 1B, and 1C.

As further shown in FIG. 5, process 500 may include obtaining, for a second analytics application, a second set of characteristics associated with the second analytics application (block 520). For example, the analytics recommendation platform (e.g., analytics recommendation platform 230, using computing resource 235, processor 320, memory 330, storage component 340, input component 350, communications interface 370, and/or the like) may obtain, for a second analytics application, a second set of characteristics associated with the second analytics application, as described, for example, in connection with FIGS. 1A, 1B, and 1C.

As further shown in FIG. 5, process 500 may include determining, for the first analytics application, a measure of similarity between the first analytics application and the second analytics application (block 530). For example, the analytics recommendation platform (e.g., analytics recommendation platform 230, using computing resource 235, processor 320, memory 330, storage component 340, input component 350, output component 360, communications interface 370, and/or the like) may determine, for the first analytics application, a measure of similarity between the first analytics application and the second analytics application, the measure of similarity being determined based on the first set of characteristics and the second set of characteristics, as described, for example, in connection with FIGS. 1A, 1B, and 1C.

As further shown in FIG. 5, process 500 may include determining, for the first analytics application, a first feature associated with the first analytics application (block 540). For example, the analytics recommendation platform (e.g., analytics recommendation platform 230, using computing resource 235, processor 320, memory 330, storage component 340, and/or the like) may determine, for the first analytics application, a first feature associated with the first analytics application, the first feature being based on the measure of similarity and a second feature associated with the second analytics application, as described, for example, in connection with FIGS. 1A, 1B, and 1C.

As further shown in FIG. 5, process 500 may include determining, for the first analytics application, a first machine learning technique associated with the first analytics application (block 550). For example, the analytics recommendation platform (e.g., analytics recommendation platform 230, using computing resource 235, processor 320, memory 330, storage component 340, and/or the like) may determine, for the first analytics application, a first machine learning technique associated with the first analytics application, the first machine learning technique being based on the measure of similarity and a second machine learning technique associated with the second analytics application, as described, for example, in connection with FIGS. 1A, 1B, and 1C.

As further shown in FIG. 5, process 500 may include performing an action based on the first feature and the first machine learning technique (block 560). For example, the analytics recommendation platform (e.g., analytics recommendation platform 230, using computing resource 235, processor 320, memory 330, storage component 340, input component 350, output component 360, communications interface 370, and/or the like) may perform an action based on the first feature and the first machine learning technique, as described, for example, in connection with FIGS. 1A, 1B, and 1C.

Process 500 may include additional aspects, such as any single aspect or any combination of aspects described below and/or in connection with one or more other processes described elsewhere herein.

In some implementations, the first set of characteristics includes at least one of: a description of the first analytics application, annotated training data associated with the first analytics application, data identifying an analysis unit that the first analytics application is to analyze, or data identifying testing data.

In some implementations, when determining the measure of similarity between the first analytics application and the second analytics application, process 500 may identify, for each characteristic included in the first set of characteristics, a corresponding characteristic included in the second set of characteristics; and determine, for each characteristic included in the first set of characteristics, a measure of similarity between the characteristic and the corresponding characteristic.

In some implementations, when determining the measure of similarity between the first analytics application and the second analytics application, process 500 may determine the measure of similarity between the first analytics application and the second analytics application based on weights associated with the first set of characteristics, each characteristic included in the first set of characteristics being associated with a respective weight.

In some implementations, when performing the action, process 500 may generate a machine learning model for the first analytics application, the machine learning model being based on the first machine learning technique and including the first feature.

In some implementations, process 500 may include receiving, from a user device, the first set of characteristics, the first set of characteristics including data defining the first analytics application. In some implementations, when performing the action, process 500 may provide the user device with data identifying the first machine learning technique and the first feature.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for recommending machine learning techniques, features, and feature relevance scores. In some implementations, one or more process blocks of FIG. 6 may be performed by analytics recommendation platform 230. In some implementations, one or more process blocks of FIG. 6 may be performed by another device or a group of devices separate from or including analytics recommendation platform 230, such as user device 210, analytics device 220, and computing resource 235.

As shown in FIG. 6, process 600 may include determining, for a first analytics application, a first set of relevance scores (block 610). For example, an analytics recommendation platform (e.g., analytics recommendation platform 230, using computing resource 235, processor 320, memory 330, storage component 340, and/or the like) may determine, for a first analytics application, a first set of relevance scores, each relevance score, included in the first set of relevance scores, being associated with a respective feature of the first analytics application, and the determination being based on an analytics application similarity model, as described, for example, in connection with FIGS. 1A, 1B, and 1C.

As further shown in FIG. 6, process 600 may include receiving, from a user device and for the first analytics application, a second set of relevance scores (block 620). For example, the analytics recommendation platform (e.g., analytics recommendation platform 230, using computing resource 235, processor 320, memory 330, storage component 340, input component 350, communications interface 370, and/or the like) may receive, from a user device and for the first analytics application, a second set of relevance scores, as described, for example, in connection with FIGS. 1A, 1B, and 1C.

As further shown in FIG. 6, process 600 may include determining a measure of similarity between the first set of relevance scores and the second set of relevance scores (block 630). For example, the analytics recommendation platform (e.g., analytics recommendation platform 230, using computing resource 235, processor 320, memory 330, storage component 340, and/or the like) may determine a measure of similarity between the first set of relevance scores and the second set of relevance scores, as described, for example, in connection with FIGS. 1A, 1B, and 1C.

As further shown in FIG. 6, process 600 may include updating the analytics application similarity model based on the measure of similarity (block 640). For example, the analytics recommendation platform (e.g., analytics recommendation platform 230, using computing resource 235, processor 320, memory 330, storage component 340, and/or the like) may update the analytics application similarity model based on the measure of similarity, as described, for example, in connection with FIGS. 1A, 1B, and 1C.

Process 600 may include additional aspects, such as any single aspect or any combination of aspects described below and/or in connection with one or more other processes described elsewhere herein.

In some implementations, process 600 may include determining, for the first analytics application and based on the analytics application similarity model, a first machine learning technique; receiving, from the user device and for the first analytics application, a second machine learning technique; and updating the analytics application similarity model based on the second machine learning technique.

In some implementations, each relevance score included in the second set of relevance scores corresponds to a relevance score included in the first set of relevance scores.

In some implementations, process 600 may determine that the measure of similarity meets a threshold measure of similarity for updating the analytics application similarity model.

In some implementations, updating the analytics application similarity model may include retraining the analytics application similarity model using data defining the first analytics application and the second set of relevance scores.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, an analytics recommendation platform 230 may enable users, including non-technical users and users unfamiliar with machine learning or a particular corpus of digital objects, to obtain a recommended machine learning model by providing one or more characteristics of an analytics application to the analytics recommendation platform 230. Recommending machine learning models may enable a wider variety of individuals to obtain and use machine learning models for a variety of analytics applications. Several different stages of the process for determining recommended machine learning techniques, features, and feature relevance scores (e.g., feature weights) are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. Also, automating the process for determining machine learning techniques, features, and feature relevance scores conserves computing resources (e.g., processor resources, memory resources, and/or the like) that would otherwise be wasted by using multiple different types of devices with different software, protocols, and configurations, and computing resources that would otherwise be wasted correcting problems that would arise from lack of consistency in the determination of machine learning techniques, features, and feature relevance scores.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   identifying, by a device, a first set of characteristics of a first analytics application;
   obtaining, by the device, a second set of characteristics of a second analytics application;
   determining, by the device, a measure of similarity between the first analytics application and the second analytics application,
      the measure of similarity being determined based on the first set of characteristics and the second set of characteristics;
   determining, by the device, a first relevance score for a first feature associated with the first analytics application,
      the first relevance score being based on the measure of similarity and a second relevance score associated with a second feature associated with the second analytics application,
      the first feature and the second feature associated with selecting features to use in a machine learning model; and
      the first relevance score indicating a measure of importance of the first feature to the machine learning model;
   determining, by the device, a third relevance score for a first machine learning technique associated with the first analytics application,
      the third relevance score being based on the measure of similarity and a fourth relevance score associated with a second machine learning technique associated with the second analytics application, and wherein the first machine learning technique includes one or more of:
a support vector machine technique,
a conditional random field technique,
Naive Bayes technique,
convolutional neural network technique, or
K-nearest neighbors technique; and
performing, by the device, an action based on the first relevance score or the second relevance score,
wherein performing the action includes generating a recommended machine learning technique for the first analytics application, the recommended machine learning technique including the first machine learning technique and the first feature, and executing the first analytics application using the recommended machine learning technique.

2. The method of claim 1, wherein the first feature is a measurable property of a digital object.

3. The method of claim 1, further comprising:
determining, for the first analytics application, a fifth relevance score for a third feature associated with the first analytics application,
the fifth relevance score being based on the measure of similarity and a sixth relevance score associated with a fourth feature associated with the second analytics application, and
the third feature being different from the first feature.

4. The method of claim 1, wherein the first feature includes at least one of:
a syntactic feature,
a lexical feature,
a morphological feature,
a grammatical feature,
an ontological feature, or
a statistical feature.

5. The method of claim 1, wherein the first machine learning technique includes one of:
a supervised machine learning technique,
an unsupervised machine learning technique, or
a combination of supervised and unsupervised machine learning techniques.

6. The method of claim 1, wherein the first analytics application is configured to perform one or more analytics operations for textual input.

7. The method of claim 1, wherein the first set of characteristics includes at least one of:
a description of the first analytics application,
annotated training data associated with the first analytics application,
data identifying an analysis unit that the first analytics application is to analyze, or
data identifying testing data.

8. A device comprising:
one or more memories; and
one or more processors, communicatively coupled to the one or more memories, to:
identify a first set of characteristics of a first analytics application;
obtain a second set of characteristics of a second analytics application;
determine a measure of similarity between the first analytics application and the second analytics application,
the measure of similarity being determined based on the first set of characteristics and the second set of characteristics;
determine, for the first analytics application, a first feature associated with the first analytics application,
the first feature being based on the measure of similarity and a second feature associated with the second analytics application, and
the first feature and the second feature associated with selecting features to use in a machine learning model;
determine a first machine learning technique associated with the first analytics application,
the first machine learning technique being based on the measure of similarity and a second machine learning technique associated with the second analytics application; and
perform an action based on the first feature and the first machine learning technique,
wherein the one or more processors, when performing the action, are to:
generate a machine learning model for the first analytics application,
the machine learning model being based on the first machine learning technique and including the first feature, and
execute the first analytics application using the machine learning model.

9. The device of claim 8, wherein the first set of characteristics includes at least one of:
a description of the first analytics application,
annotated training data associated with the first analytics application,
data identifying an analysis unit that the first analytics application is to analyze, or
data identifying testing data.

10. The device of claim 8, wherein the one or more processors, when determining the measure of similarity between the first analytics application and the second analytics application, are to:
identify, for each characteristic included in the first set of characteristics, a corresponding characteristic included in the second set of characteristics; and
determine, for each characteristic included in the first set of characteristics, a measure of similarity between the characteristic and the corresponding characteristic.

11. The device of claim 10, wherein the one or more processors, when determining the measure of similarity between the first analytics application and the second analytics application, are further to:
determine the measure of similarity between the first analytics application and the second analytics application based on weights associated with the first set of characteristics,
each characteristic included in the first set of characteristics being associated with a respective weight.

12. The device of claim 8, wherein the one or more processors are further to:
receive, from a user device, the first set of characteristics, the first set of characteristics including data defining the first analytics application.

13. The device of claim 12, wherein the one or more processors, when performing the action, are to:
provide the user device with data identifying the first machine learning technique and the first feature.

14. A non-transitory computer-readable medium storing a set of instructions, the set of instructions comprising:
one or more instructions that, when executed by one or more processors of a device, cause the device to:

identify a first set of characteristics of a first analytics application;
obtain a second set of characteristics of a second analytics application;
determine a measure of similarity between the first analytics application and the second analytics application,
  the measure of similarity being determined based on the first set of characteristics and the second set of characteristics;
determine a first relevance score for a first feature associated with the first analytics application,
  the first relevance score being based on the measure of similarity and a second relevance score associated with a second feature associated with the second analytics application,
  the first feature and the second feature associated with selecting features to use in a machine learning model, and
  the first relevance score indicating a measure of importance of the first feature to the machine learning technique;
determine a third relevance score for a first machine learning technique associated with the first analytics application,
  the third relevance score being based on the measure of similarity and a fourth relevance score associated with a second machine learning technique associated with the second analytics application; and
perform an action based on the first relevance score or the second relevance score,
  wherein the one or more instructions, that cause the device to perform the action, cause the device to:
    generate a recommended machine learning technique for the first analytics application, the recommended machine learning technique including the first machine learning technique and the first feature, and
    execute the first analytics application using the recommended machine learning technique.

15. The non-transitory computer-readable medium of claim 14, wherein the first feature is a measurable property of a digital object.

16. The non-transitory computer-readable medium of claim 14, wherein the one or more instructions further cause the device to:
  determine, for the first analytics application, a fifth relevance score for a third feature associated with the first analytics application,
  the fifth relevance score being based on the measure of similarity and a sixth relevance score associated with a fourth feature associated with the second analytics application, and
  the third feature being different from the first feature.

17. The non-transitory computer-readable medium of claim 14, wherein the first feature includes at least one of:
  a syntactic feature,
  a lexical feature,
  a morphological feature,
  a grammatical feature,
  an ontological feature, or
  a statistical feature.

18. The non-transitory computer-readable medium of claim 14, wherein the first machine learning technique includes one of:
  a supervised machine learning technique,
  an unsupervised machine learning technique, or
  a combination of supervised and unsupervised machine learning techniques.

19. The non-transitory computer-readable medium of claim 14, wherein the one or more instructions further cause the device to perform one or more analytics operations for textual input.

20. The non-transitory computer-readable medium of claim 14, wherein the first set of characteristics includes at least one of:
  a description of the first analytics application,
  annotated training data associated with the first analytics application,
  data identifying an analysis unit that the first analytics application is to analyze, or
  data identifying testing data.

* * * * *